(12) United States Patent
Khang et al.

(10) Patent No.: US 7,022,296 B1
(45) Date of Patent: Apr. 4, 2006

(54) METHOD FOR TREATING FLUE GAS

(75) Inventors: Soon-Jai Khang, Cincinnati, OH (US); Timothy Keener, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 268 days.

(21) Appl. No.: 09/712,626

(22) Filed: Nov. 14, 2000

Related U.S. Application Data

(62) Division of application No. 09/113,891, filed on Jul. 10, 1998, now abandoned.

(60) Provisional application No. 60/052,816, filed on Jul. 10, 1997.

(51) Int. Cl.
| | |
|---|---|
| *B01D 53/96* | (2006.01) |
| *B01D 53/50* | (2006.01) |
| *B01D 53/56* | (2006.01) |
| *B01D 53/70* | (2006.01) |
| *B01D 53/68* | (2006.01) |

(52) U.S. Cl. .............................. 423/210; 95/57; 95/73; 423/215.5; 423/235; 423/240 R; 423/240 S; 423/241; 423/243.01; 423/243.08; 423/244.01; 423/244.07; 423/244.08; 423/245.1; 423/245.2

(58) Field of Classification Search ................ 423/210, 423/215.5, 235, 240 R, 243.01, 244.07, 245.1, 423/241, 244.01, 244.08, 240 S, 243.08, 423/245.2; 95/57, 73
See application file for complete search history.

(56) References Cited

U.S. PATENT DOCUMENTS

| | | | |
|---|---|---|---|
| 1,204,906 A | 11/1916 | Schmidt et al. | |
| 1,766,422 A | 6/1930 | Wintermute et al. | |
| 2,013,753 A | 9/1935 | Hahn | |
| 3,026,964 A | 3/1962 | Penney | .......................... 183/7 |
| 3,284,990 A | 11/1966 | Orne | ............................. 183/7 |
| 3,533,748 A * | 10/1970 | Finfer et al. | |

(Continued)

FOREIGN PATENT DOCUMENTS

WO     WO94/13391     * 6/1994

OTHER PUBLICATIONS

Hackh's Chemical Dictionary (Fourth Edition), McGraw-Hill, Inc.(1969), p. 257, (no month).*

*Primary Examiner*—Wayne A. Langel
(74) *Attorney, Agent, or Firm*—Wood, Herron & Evans, L.L.P.

(57) ABSTRACT

A multiple-field precipitator, flue-gas treating device, in accordance with the principles of the invention, includes a first section having a dual-function, sensible-cooling heat exchanger/electrostatic precipitator, a second section having a wet electrostatic precipitator, and a middle section fluidly connecting the first and second sections. In the first section, the exchanger/precipitator sensibly cools the flue gas and collects most of the dust from the flue gas. In the middle section, the dust-reduced flue gas is combined with an alkaline material, thereby forming reaction products. These reaction products and several other pollutants are captured by the wet electrostatic precipitator, in the form of a pollutant-laden liquid. The pollutant-laden liquid is directed to a series of heat exchangers and settling tanks, where various pollutants such as $SO_x$, metals, $NO_x$, and chlorides are removed in different stages. In addition, ammonia is liberated from the pollutant-laden liquid, and circulated back to the middle section, where it is combined with additional dust-reduced flue gas to form additional reaction products for subsequent capture in the wet electrostatic precipitator.

3 Claims, 3 Drawing Sheets

U.S. PATENT DOCUMENTS

| | | | |
|---|---|---|---|
| 3,665,676 A | 5/1972 | McKewen | 55/4 |
| 3,745,751 A | 7/1973 | Zey et al. | 55/122 |
| 3,899,308 A | 8/1975 | Petersson | 55/8 |
| 3,958,960 A | 5/1976 | Bakke | 55/118 |
| 4,074,983 A | 2/1978 | Bakke | 55/118 |
| 4,197,278 A * | 4/1980 | Gehri et al. | |
| 4,261,738 A | 4/1981 | Valentine et al. | 75/103 |
| 4,340,207 A * | 7/1982 | Bruhn et al. | 266/155 |
| 4,364,910 A | 12/1982 | Willett et al. | 423/242 |
| 4,431,434 A | 2/1984 | Rinard et al. | 55/135 |
| 4,726,814 A | 2/1988 | Weitman | 55/11 |
| 4,776,391 A | 10/1988 | Warner | 165/111 |
| 4,885,139 A | 12/1989 | Sparks et al. | 422/169 |
| 5,030,428 A * | 7/1991 | Dorr et al. | 423/215.5 |
| 5,137,546 A | 8/1992 | Steinbacher et al. | 55/10 |
| 5,137,704 A | 8/1992 | Eschenburg | 423/235 |
| 5,176,088 A | 1/1993 | Amrhein et al. | 110/345 |
| 5,282,429 A * | 2/1994 | Kato et al. | 110/344 |
| 5,330,733 A | 7/1994 | Baroni et al. | 423/235 |
| 5,424,044 A | 6/1995 | Kalka | 422/171 |
| 5,470,556 A | 11/1995 | Samish | 423/243.08 |
| 5,569,436 A * | 10/1996 | Lerner | 422/170 |
| 5,575,982 A * | 11/1996 | Reiss et al. | 428/210 |
| 5,792,238 A * | 8/1998 | Johnson et al. | 95/73 |
| 5,871,703 A | 2/1999 | Alix et al. | 423/210 |

* cited by examiner

METHOD FOR TREATING FLUE GAS

This patent document is a divisional patent document of U.S. patent application Ser. No. 09/113,891, now abandoned, entitled "Method and Apparatus for Treating Flue Gas" and filed on Jul. 10, 1998, which claims the benefit of the filing date of Provisional U.S. Patent Application No. 60/052,816 entitled "Heat-Exchanger/Wet-Film Electrostatic Precipitator for Flue Gas Cleaning" and filed on Jul. 10, 1997. Accordingly, this divisional patent document claims the benefit of the filing date of Provisional U.S. Patent Application No. 60/052,816, and the entire disclosure of that provisional application is incorporated into this divisional patent document by reference.

BACKGROUND OF THE INVENTION

1. Field of the Invention

This invention relates to a method and apparatus for the treatment of flue gases containing dust and/or pollutants.

2. Description of the Related Art

In known processes for electrostatic purification of dust- and pollutant-containing exhaust gases, the latter are subjected to an electrostatic purification under dry conditions in a first processing stage and in a succeeding second processing stage are subjected to an electrostatic purification under wet conditions. One or more electric fields operating under dry conditions, and one or more electric fields operating under wet conditions are arranged in succession. The water is sprayed through nozzles into the wet field or fields and is drained as a slurry, which is concentrated in thickeners and is then injected by means of steam or compressed air into a drying tower, in which the evaporated liquid humidifies the hot drying gas so that a back corona discharge in the fields operating under dry conditions is prevented. Acid components, such as $SO_x$, HF and HCl, are absorbed from the liquid which has been sprayed into the wet stage and, together with the dust which is still collected in the wet stage, enter a sump disposed in the wet stage. A disadvantage of that process resides in that the sludge formed in the sump of the wet stage contains a relatively large amount of pollutants in addition to the dust, and for this reason, the sludge can be processed only with difficulty. A further disadvantage of that process resides in that the evaporated liquid which has been injected into the drying tower will moisten the dust- and -pollutant-containing exhaust gas so that its dew point temperature will be increased. Because the gas temperature is decreased at the same time, the temperature in the electrostatic precipitator will decrease below the dew point temperature so that a corrosion caused by the acid components of the exhaust gas cannot be avoided.

U.S. Pat. No. 1,766,422 also describes the electrostatic purification of dust- and pollutant-containing exhaust gases in a process in which the exhaust gas laden with dust and pollutants is first subjected to electrostatic purification under dry conditions and subsequently to electrostatic purification under wet conditions. In that process, the collecting electrodes of the wet electrostatic purification stage are wetted with a treating liquid. The electrostatic precipitator is operated at such a high gas velocity, that the particles of the fine fraction will be collected in the dry electrostatic purification stage, and those of the coarse fraction will be collected in the wet electrostatic purification stage. In that process, the sludge formed in the sump of the wet electrostatic purification stage will contain a relatively large amount of pollutants in addition to the dust. An additional disadvantage of that process resides in that the exhaust gas is passed through the electrostatic precipitator at a relatively high gas velocity to ensure that the coarse particles of the dust contained in the exhaust gas can be collected in the wet electrostatic purification stage. As a result, the residence time of the exhaust gas in the wet electrostatic purification stage is not sufficient to ensure that the pollutants contained in the exhaust gas will be removed to a sufficient degree.

U.S. Pat. No. 4,364,910, Willet et al., issued Dec. 21, 1982, discloses a similar system and process for flue gas processing, to remove both gaseous contaminants, such as sulfur dioxide, and particulate matter such as flyash. This process integrates spray scrubbing apparatus, and wet electrostatic precipitation apparatus, and provides for the advantageous extraction and utilization of heat present in the flue gas which is being processed. The integrated system and process utilize a spray scrubbing tower into which the flue gas in introduced and into which aqueous alkali slurry is introduced as spray for sulfur dioxide removal therein. The flue gas leaves the tower in a moisture-laden state, and enters a wet electrostatic precipitator which includes a heat exchanger, where flyash and entrained droplets in the flue gas are removed by electrostatic precipitation and that is removed from the flue gas. The cleaned flue gas exits from the precipitator and discharges into a stack. The wet electrostatic precipitator of the integrated system and process includes a portion constructed as a cross-flow heat exchanger, with flue gas saturated with water vapor moving vertically upward inside tubes arranged in a staggered pattern, and ambient air being pulled horizontally across the outside of those tubes to cool the tube walls and thereby remove heat from the flue gas and cause condensation of water vapor on the inside wall surfaces. The condensate washes the electrostatically collected flyash particles down from the inside tube walls.

U.S. Pat. No. 4,776,391, Warner, issued Oct. 11, 1988, discloses a flue gas cleaning system, whereby an exhaust gas containing sulfur trioxide is passed through a first heat exchanger which cools the gas to a temperature which is above the sulfur trioxide dew point, so that condensation of sulfur trioxide does not occur in the first heat exchanger, but which is below a material-limit operating temperature of a second heat exchanger, which further cools the gas below the sulfur trioxide dew point, whereby the first heat exchanger is protected against corrosion and the second heat exchanger is protected against thermal damage.

U.S. Pat. No. 3,284,990, discloses a method of improving the electrostatic precipitation of particles by adding phosphorous pentoxide to the particles prior to their electrostatic precipitation.

U.S. Pat. No. 3,665,676 discloses a system to condition the particles of boiler flue gas by the use of a salt solution, such as a solution of ammonium sulfate or ammonium bisulfate. The salt solution is injected into the flue gas prior to entering the electrostatic precipitator, and the system includes a metering means for controlling the amount of conditioner injected into the flue gas. U.S. Pat. No. 3,665,676 indicates that, if desired, conventional automatic controls can be provided to open the metering means when the flue gas reaches the desired operating temperature, or to close it should the temperature fall below operating temperature. In addition, automatic controls can also be made to open the metering means to provide the amount of conditioner needed in proportion to the volume of gas to be conditioned.

U.S. Pat. No. 4,885,139, Sparks, issued Dec. 5, 1989, discloses a method for improving the cost-effectiveness of sulfur oxide- and particulate matter-removal, placing a sulfur oxide- or other acidic gas-removal system and a multistage electrostatic precipitator within a single housing. The removal system works by spraying a neutralizing slurry or solution into incoming flue gas to form neutral salts which dry in a reaction zone provided between the removal system and the electrostatic filtration module. This system also provides for simple retrofitting of existing systems to include $SO_2$— or other acidic gas-removal systems.

In U.S. Pat. No. 4,885,139 there is disclosed a wet electrostatic precipitator in which furnace gases containing dust are contacted with water or solution to saturate them with water vapor. The saturated gases pass to an electrical precipitator wherein the temperature of the gases is reduced sufficiently to cause condensation of some of the water vapor to form a stream of condensed liquid on collecting electrodes. The walls of the collecting electrodes are maintained at a temperature which is cooler than the gasses passing through, by circulation of external air assisted by blower means or by other suitable cooling means, to cause condensation of moisture thereon, sufficient to form a continuous stream of film to continually wash away collected materials.

U.S. Pat. No. 3,958,960, Bakke, issued May 25, 1976, discloses a precipitator which includes one or more main sections, each having a plurality of spaced, substantially parallel collection plates, with discharge electrodes being interposed in the spaces between the collection plates. The plates extend in the direction of flow of a gaseous medium through the precipitator from an inlet to an outlet. Sprays of water are continuously directed against the collection plate surfaces. The gaseous medium enters through a diverging inlet section in which are arranged several sets of baffles in longitudinal spaced relation. Each set of baffles includes at least two rows of channels extending at a slight angle to the vertical axis. The channels in each row are spaced apart a distance greater than their width, and the rows are offset so that each channel in a second row is opposite a space between channels in a first row. Sprayers direct water on the upstream surfaces of the baffles in each set, the sprayers being directed both in the direction of the flow of the gaseous medium and transverse thereto. Following the inlet section, there is a transverse electrostatic precipitator section in which sets of baffles are arranged transverse to the direction of flow of the gaseous medium upstream and downstream of the transverse discharge electrodes. Water sprays are continuously applied to the latter baffles. An extended discharge section is provided upstream and downstream of the main precipitator sections, including transverse baffles and electrodes for applying a field toward the baffles from the main sections along the path of the medium. The final section is a transverse electrostatic precipitator section defining a mist eliminator, the baffles of which may be sprayed intermittently as required. An outlet section following the mist eliminator section is provided with a set of baffles, the rows of which are in overlapping relation so that their is no "open flow".

U.S. Pat. No. 5,137,546, Steinbacher, et al., issued Aug. 11, 1992, discloses a process and an apparatus for the electrostatic purification of dust- and pollutant-containing exhaust gases in multiple-field precipitators. The exhaust gases are first subjected in a first stage to an electrostatic purification under dry conditions in gas passages defined by plate-like collecting electrodes, and are subsequently passed in a second stage through one or more fields defined by liquid-wetted collecting electrodes, which define gas passages. The liquid which is supplied in the second stages at the top ends of the collecting electrodes is laterally discharged from the precipitator, and the substantially dry dust which is still collected in the second stage is fed to dust-receiving means.

U.S. Pat. No. 5,330,733, Baroni, et al., issued Jul. 19, 1994, discloses a method for removing pollutants from a combustion gas. A combustion gas is cooled a first time to about 110° C. in a first cooling chamber, up to 90% of the ash is removed in a first precipitator, and the gas is cooled again in a second cooling chamber to about 80° C.; in a reaction chamber, by energization by means of electrons, the sulfur dioxide and nitrogen oxides are converted into sulfuric acid and nitric acid and, with the addition of dry ammonia, the two acids are converted to salts of ammonia, and the latter are retained in a second precipitator and sent to a chimney; from the instant of the injection of the ammonia into the reaction chamber, the temperature of the gas is maintained at above 80° C. to reduce the thermochemical conversion of the sulfur dioxide to acidic sulfites and sulfates; in a subsequent injection chamber, hydrogen peroxide is injected into the gas to convert the residual sulfur dioxide into sulfuric acid which, reacting with the ammonia produces ammonia salts. The '733 patent claims a method for removing pollutants from a combustion gas taken from a boiler plant, with the combustion gas containing light ashes, sulfur dioxide and nitrogen oxides as pollutants. The method comprises: cooling the combustion gas in a heat exchanger to about 110° C.; removing at least most of the light ashes from the combustion gas in at least one electrostatic precipitator; energizing the combustion gas by means of electrons generated by impulsive electric fields to convert most of the sulfur dioxide and the nitrogen oxides into sulfuric acid and nitric acid, respectively, with the presence of residual sulfur dioxide; adding dry ammonia prepared in a gas environment and stored at a temperature of about 100° C. to the combustion gas to convert the sulfuric acids and nitric acids into the ammonium salts of these acids, producing a combustion gas containing ammonium sulfate, ammonium nitrate, sulfur dioxide, and ammonia; introducing hydrogen peroxide into the combustion gas to convert the residual sulfur dioxide into sulfuric acid, which reacts with the ammonia to produce ammonium sulfate; removing the ammonium slats from the combustion gas in an electrostatic precipitator; and passing the combustion gas to a chimney.

U.S. Pat. No. 3,745,751, Zey, et al., issued Jul. 17, 1973, discloses a sulfur dioxide collection system comprising ozone-producing electrodes upstream from a baghouse, electrostatic precipitator, or scrubber, etc., whereby ozone is produced and simultaneously reacted with sulfur dioxide in the gas stream, thereby forming sulfur trioxide which is converted to sulfuric acid mist prior to, or after entry into, the conventional collector. The collection system removes the acids mist (together with particulates, if any) from the flowing gas.

SUMMARY OF THE INVENTION

It is therefore an object of one aspect of the invention to provide for the electrostatic purification of dust- and pollutant-containing exhaust gases, also known as flue gases, using a process by which the above-mentioned disadvantages will be avoided, and which permits a separate collection of dry dust and heat, on the one hand, and of pollutants, on the other hand, and in which pollutants contained in the exhaust gas are collected in a substantially dust-free state in a wet electrostatic purification stage.

In one beneficial form, the present invention involves two sections of electrostatic precipitator (ESP) collection plates.

The collection plates of the first section act as heat exchanger plates, where simultaneous sensible cooling and particle collection take place. The collection plates of the second section are covered with a wet film of water or aqueous solution flowing downward, where simultaneous condensation and collection of acid neutralization products take place.

In this particular version of the invention, the purpose of the first section is to simultaneously remove particles (mostly flyash) and recover heat via sensible cooling, and to maintain a dry condition thereby reducing and/or preventing the risk of corrosion in the first section. The temperature of the first section is advantageously maintained at between 5° F. and 30° F. above the dew point temperature, thereby preventing condensation. To prevent collection of sulfur trioxide and other acidic compounds on the collection plate, a small amount of calcium hydroxide or another alkaline material (e.g., ammonia gas) is injected upstream of the first section. Addition of the alkaline material at a controlled rate of up to about ten percent of the acid molar amount of sulfur-containing oxides may be beneficial.

Gaseous ammonia and/or a fine powder of one or more other alkaline materials may be injected into a middle section between the first and second sections. The alkaline compound or compounds quickly react(s) with sulfur dioxide, sulfur trioxide, and various forms of nitric oxides, and the reaction products are electrostatically charged by high voltage wires, and effectively collected by the wet collection plates of the second section. The second section includes a wet-film precipitator and is substantially dust-free, since the vast majority of the particles are removed in the first section. The collected reaction products on the collection plates are carried down to a collection trough by the water flowing down from the top of the plates. Up to a 98% removal of acidic gas components is expected. The liquid in the collection trough, including various components such as reaction products, unreacted compounds, residual dust, and the like, is referred to as a pollutant-laden liquid. This liquid is pumped out for further treatment and water recycling.

Some of the advantages of the invention over the related art include (a) low gas-phase pressure drop; (b) low liquid-pumping cost; (c) high removal efficiency of sulfur oxides and nitric oxides; (d) high-efficiency removal of particles; (e) high-efficiency heat recovery; and (f) water recovery from flue gas with low water evaporation, thereby decreasing water usage.

A further objective of the present invention is to provide heat exchanger plates which perform simultaneous dust collection and heat recovery resulting in significant savings in the area of materials and pressure drop.

Another objective is to provide a "wet precipitator" which removes $NO_x$ and $SO_x$, which operates under substantially dust-free conditions, and which operates at the lowest practicable temperature in order to prevent water evaporation. This enhances mass transfer, eliminates plume visibility, and conserves water.

Yet another objective is the removal of metals, and metallic compounds containing metals, such as mercury, selenium, arsenic, lead, chromium and others. A further objective is the removal of organic chloride compounds.

Other objects, features and advantages of the present invention will become apparent from the following Detailed Description. It should be understood, however, that the Detailed Description, including the specific example, while indicating beneficial forms of the invention, is given by way of illustration only, since various changes and modifications within the scope of the invention will become apparent to those skilled in the art from a reading of this Detailed Description.

BRIEF DESCRIPTION OF THE DRAWINGS

The features and advantages of the present invention will be more fully apparent in view of the drawings, in which.

DETAILED DESCRIPTION OF THE DRAWINGS

Figure 1:
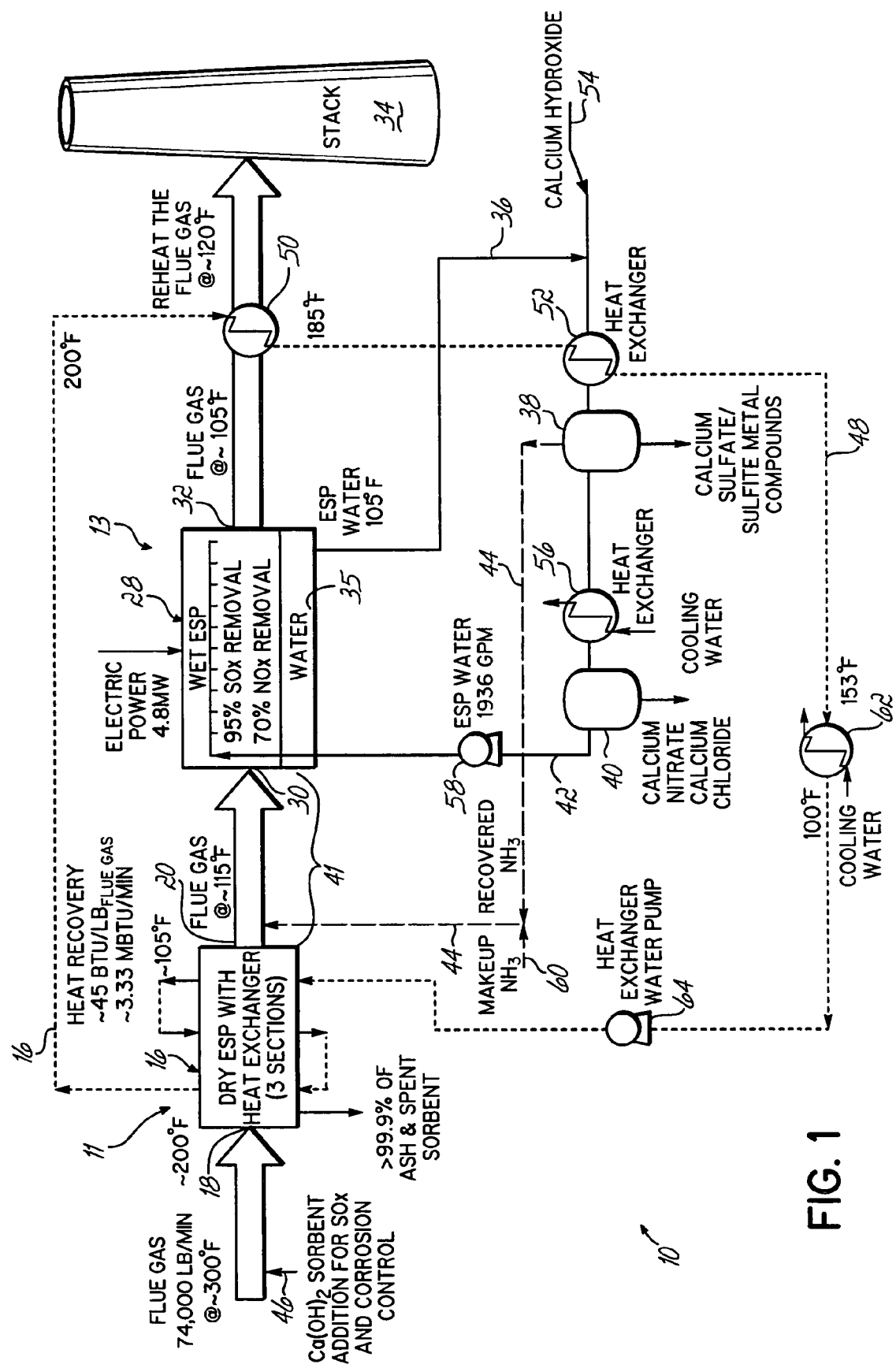
FIG. 1 is a schematic, flow diagram of a version of the flue gas treatment system according to the principles of the invention.

The flue-gas treating device 10 shown in FIG. 1, in accordance with the principles of the invention, includes a first section 11 having a sensible-cooling heat exchanger (not numbered) and a first electrostatic precipitator (not numbered). The device 10 is ideally suited for treating a flue gas containing a dust or a pollutant. As used herein, the term "dust" refers to any solid particle within a flue gas, with one example being flyash. The term "pollutant", as used herein, includes acid gases, metals, metallic compounds, and chlorinated organic compounds. Examples of acid gases include sulfur-containing oxides ($SO_x$) and nitrogen-containing oxides ($NO_x$), as well as chlorine and fluorine, in any particular state. For example, the chlorine or fluorine may be atomic, including ionic, and/or a part of a compound. Examples of a metal pollutant, in either pure or metallic-compound form, include mercury, selenium, arsenic, lead, chromium, cadmium, beryllium, nickel, and manganese. Examples of chlorinated organic compounds include dioxins and furans.

As mentioned briefly above, the first section 11 includes a sensible-cooling heat exchanger (not numbered). As used herein, the term "sensible cooling" refers to a form of cooling which is accomplished without condensation of water which may be present in the flue gas, and without evaporation of water which may be present in the flue gas. In further detail, the term "sensible cooling" refers to cooling without changing the humidity mass ratio of the flue gas. The humidity mass ratio may be defined as the mass of water divided by the mass of dry flue gas.

Figure 4:
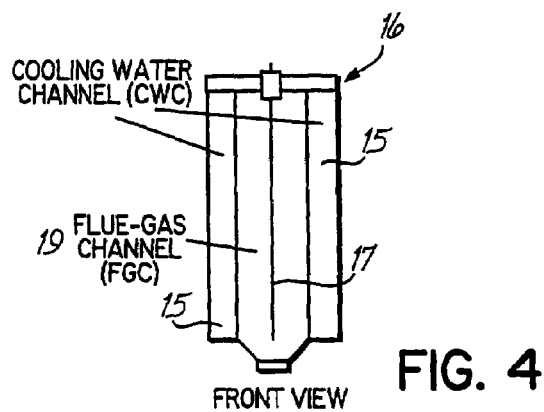
FIG. 4 is a schematic, transverse, sectional view of FIG. 3.

As shown in FIG. 1, the sensible-cooling heat exchanger (not numbered) and first electrostatic precipitator (not numbered) are located within a first housing (not numbered), with the housing (not numbered) having a flue-gas inlet 18 and a flue-gas outlet 20. The heat exchanger (not numbered) and precipitator (not numbered) advantageously are of the plate variety; most advantageously, the heat exchanger (not numbered) and precipitator (not numbered) are one in the same, being either a heat exchanger or a collection plate, modified as necessary, and operated to serve the dual functions of sensible cooling and dust collection. The resulting assembly is referred to herein as a heat exchanger/collection plate assembly 15. Upon reading this Detailed Description, those of ordinary skill in the art will readily understand that several heat exchanger and/or collection plate units may be fluidly connected to one another to form one or more assemblies 15, as needed, in order to provide a desired surface area sufficient for adequate sensible cooling and particulate collection. Moreover, the heat exchanger and/or collection plate units may be aligned within the housing 16 in any of a number of conventional design patterns. For example, as shown in FIG. 4, two rows of heat exchanger/collection plate assemblies 15 are arranged within the housing 16, on either side of a series of corona wires 17, thereby forming a central flue gas channel 19.

With regard to the sensible-cooling aspect of the invention, any suitable fluid may be used, with water being a convenient choice. In addition, any suitable pattern of fluid flow through a heat exchanger/collection plate assembly may be used. Advantageously, if an exchanger/collection plate assembly is oriented in a vertical alignment, the fluid flow is a counter-current flow, with the fluid entering the exchanger/collection plate assembly near that the rear of the housing, and circulating up and down through the exchanger/collection plate assembly toward the front of the housing. As noted above, while any suitable heat exchanger(s) and/or collection plate(s) may be used, the exchanger(s)/plate(s) should be grounded, and also should be hung from a support structure within the housing 16, as shown, for example, in FIGS. 2–5. In addition, the corona wires 17 may be suspended from a support structure; however, as will be understood by those of skill in the art, these corona wires 17 should be electrically isolated and insulated using a conventional insulation 21. If desired, as understood by those of skill in the art, the housing 16 may be provided with a solenoid-operated anvil which may be dropped down onto the heat exchanger/collection plate assembly or assemblies 15, thereby causing clumps of dust to fall to the bottom of the housing 16, where they may be removed by a conventional dust-collecting hopper or any other suitable device, as is understood in the art. The power to the first housing 16 beneficially is provided using a transformer rectifier which enables a different amount of current to be supplied to each heat exchanger/collection plate unit in an assembly 15, if more than one unit is combined to form a given assembly 15.

One purpose of the first section 11 is to simultaneously remove dust (mostly flyash) and recover heat sensibly, maintaining a dry condition in order to minimize or prevent the risk of corrosion in the section 11. The temperature of the first section 11 advantageously is maintained from about 5° F. to about 30° F. above the dew point temperature. To prevent collection of sulfur trioxide and other acidic compounds on the exchanger/collection plate assembly 15, a small amount of calcium hydroxide or another alkaline material (e.g., ammonia gas), up to about 10% of the total acid molar amount of $SO_x$, may be injected upstream of the first section 11. Because the heat exchanger/collection plate assembly 15 performs dust collection and heat recovery at the same time, significant savings in materials and pressure drop may be achieved.

The flue gas treating device 10 further includes a second section 13 having a collecting-liquid delivery element 22 and a second electrostatic precipitator 24. In more detail, the second electrostatic precipitator 24 includes a collection surface 26, with the collecting-liquid delivery element 22 capable of delivering a collecting liquid to the collection surface 26. In further detail, the collecting-liquid delivery element 22 and second electrostatic precipitator 24 are located within a second housing 28 having a flue-gas inlet 30 and a flue-gas outlet 32. The flue-gas inlet 30 is connected to the flue-gas outlet 20 of the first housing 16, while the flue-gas outlet 32 of the second housing 28 is connected to a stack 34.

Figure 2:
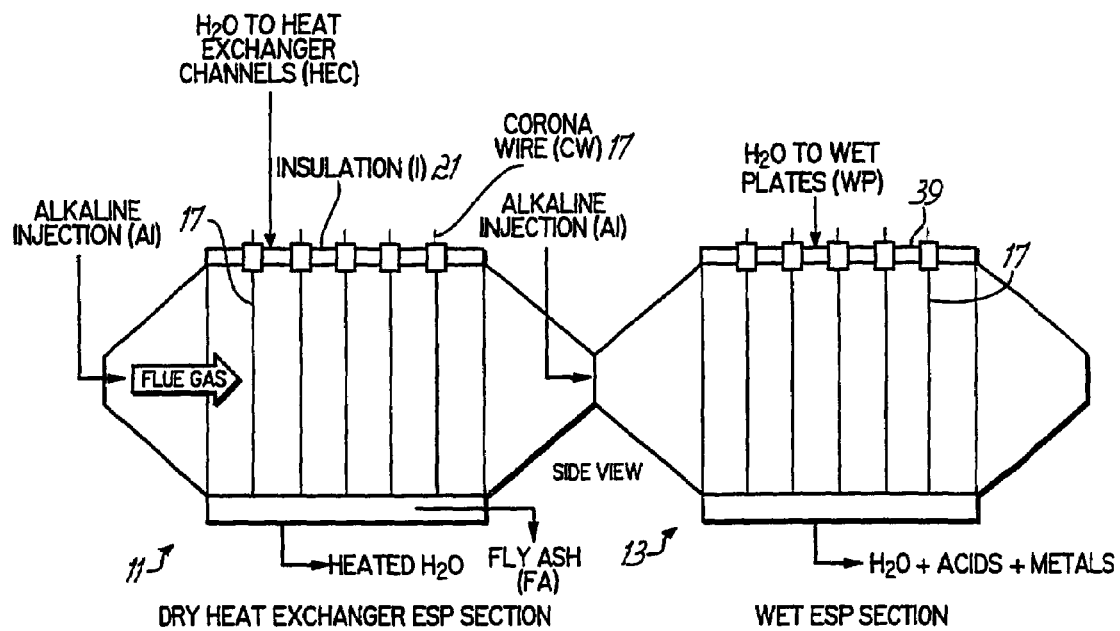
FIG. 2 is a schematic, longitudinal, sectional view of a portion of another version of the flue gas treatment system in accordance with the principles of the invention.
Figure 3:
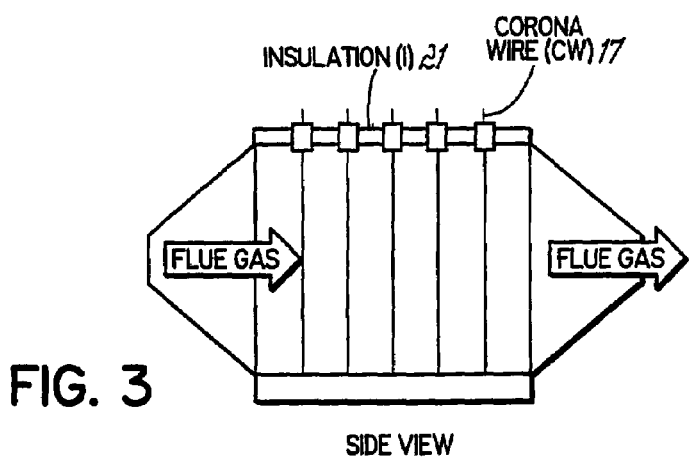
FIG. 3 is a schematic, longitudinal, sectional view showing the first section of the system of FIG. 2.
Figure 5:
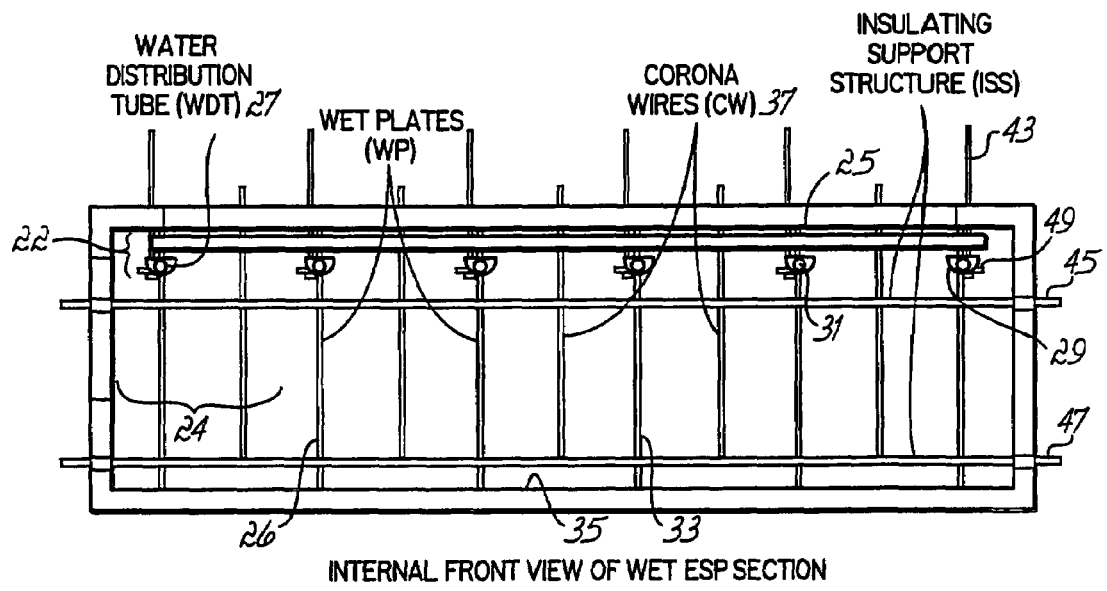
FIG. 5 is a schematic, transverse, sectional view of the second stage of the assembly of FIG. 2.

The collecting-liquid delivery element 22 and second electrostatic precipitator 24, often referred to as a "wet electrostatic precipitator", may be constructed and arranged in any suitable fashion, as will be understood by those of ordinary skill in the art. In one particular version, as shown in FIG. 5, the "wet electrostatic precipitator" includes a collecting-liquid delivery element 22 and a second electrostatic precipitator 24 contained within a second housing 28. In more detail, the collecting-liquid delivery element 22 includes two water distribution tubes extending horizontally across the inside of the housing 28 adjacent the housing upper wall 25. The first water distribution tube 27 is positioned near the front of the housing 16, and the second water distribution tube (not shown) is positioned near the back of the housing 16. The housing 16 further includes several overflow troughs 29, which are aligned in a side-by-side relationship, running the length of the housing 16, and positioned just below the liquid distribution tubes. Each overflow trough 29 includes a liquid-distributing pipe 31 which runs the length of the particular overflow trough 29, and is positioned within the elongated cavity formed by each overflow trough 29. Each liquid-distributing pipe 31 is connected to the front and rear liquid distribution tubes, and includes several openings, thereby enabling a liquid to be fed into each of the overflow troughs 29. The second electrostatic precipitator 24 includes a collection plate 33, or series of collection plates 33, secured to the base of the exterior surface of each overflow trough 29, thereby enabling water to flow over the edges of each overflow trough 29 and onto each collection plate 33. The housing 16 further includes a collecting trough 35 at the base of the housing 16, for collecting and conveying pollutant-laden liquid. As best shown in FIGS. 2 and 5, the housing 16 also includes several rows of corona wires 37 which are electrically isolated and insulated with a conventional insulating material 39, with each row of wires 37 being positioned between two elongated collection plates 33 or series of collection plates 33.

In further detail, each of the overflow troughs 29 advantageously is dimensioned such that each collection plate 33 will be wetted uniformly with a liquid film. Although not shown in FIG. 5, at least one edge of each of the overflow troughs 29 may include a series of comb-like slits or channels, thereby assisting in uniformly wetting each collection plate 33 and providing an approximately constant thickness to the liquid film. If desired, a separate collecting trough may be provided at the bottom end of each of the collecting plates. Regardless of the number of collecting troughs, however, the trough or troughs should be dimensioned so that the entire volume of pollutant-laden liquid may be collected and subsequently conducted away. For example, if flue gas is processed at a rate of 100,000 $m^3/h$, the pollutant-laden liquid usually is collected at a rate of from about 5,000 to about 25,000 $m^3/h$. The particular housing 16 shown in FIG. 5, also has an internal frame which provides for vertical and horizontal adjustment of the collection plates 33. For vertical adjustment, the frame includes several rods 43 which are connected to the collection plates 33 by adjustment screws 49, which extend up and out of the housing 28 through the housing top wall. The horizontal-adjusting aspect of the frame includes a series of upper and lower rods 45, 47 which extend horizontally from the left side of the housing 28 to the right side of the housing 28, and which are connected to the collection plates 33.

In use, the collection plates 33 of the second section 13 are covered with a wet film of liquid flowing downward, where simultaneous condensation and collection of acid neutralization reaction products and other pollutants are taking place. The liquid which is supplied in the second section 13 at the top ends of the collecting plates 33, as well as the reaction products and various other pollutants (collectively referred to as the "pollutant-laden liquid") are carried downward, where they are collected under the lower ends of the collecting plates 33, and laterally discharged from the section 13. Up to about 98% removal of acidic gas components is expected. The second section 13 removes $NO_x$ and $SO_x$, and operates under substantially dust-free conditions and at the lowest practicable temperature which prevents water evaporation. This enhances mass transfer, eliminates plume visibility, and conserves water.

In further detail, and with reference to FIG. 1, this particular flue-gas treating device 10 has a pollutant-laden liquid line 36 connected to the second housing 28. This line includes a first chemical-separation member 38, a heat exchanger 56, and a second chemical-separation member 40, with each chemical-separation member 38, 40 advantageously being a settling tank. In one particular form of the invention, the first chemical-separation member 38 may be used to remove sulfur-containing oxides, metals, and/or metal-containing compounds from the pollutant-laden liquid in the pollutant-laden liquid line 36. In addition, the second chemical-separation member 40 may be used to collect pollutants such as chlorides and/or nitrogen-containing oxides. A spent-liquid return line 42 is connected to the pollutant-laden liquid line 36, and advantageously may be used to return liquid to the collecting-liquid delivery element 22 in the second housing 28. If desired, the line 42 may include a heat exchanger/water pump 58. Although not required, the liquid passing through the spent-liquid return line 42 advantageously will have had one or more pollutants removed during its pass through the pollutant-laden liquid line 36. This aspect of the invention is particularly beneficial in that it enables liquid to be conserved as the particular flue gas is being treated.

The flue-gas treating device 10 shown in FIG. 1 also has an ammonia/ammonia-derivative return line 44 which is connected to the pollutant-laden liquid line 36. This ammonia/ammonia-derivative return line 44 advantageously is connected to at least one of the first and second chemical-separation members 38, 40. In the particular device 10 shown in FIG. 1, the return line 44 is connected to the first chemical-separation member 38. The return-line 44 aspect of the invention is highly beneficial, in that it allows not only the recovery of ammonia and/or an ammonia-derivative, but also the use of the recovered ammonia or ammonia-derivative as an alkaline material, to be injected into the flue-gas stream at any of a number of different points along the treatment device 10 where the addition of an alkaline material may be beneficial. For example, the return line 44 may reenter the device 10 at a point between the first housing 16 and second housing 28, as shown in FIG. 1. If desired, an injection port 60 may be included, for the addition of an alkaline material from an external supply source into the device 10. Advantageously, this port 60 may be connected to the return line 44.

The flue-gas treating device 10 of FIG. 1 incorporates several additional components, as described immediately below. In particular, an injection port, as at 46, may be used to add an alkaline material to the flue gas prior to the entry of the flue gas into the first housing 16. In addition, the device 10 is extremely efficient in its use and recycling of the hot fluid formed in the sensible-cooling heat exchanger/collection plate assembly 15. In particular, the device 10 includes a hot-fluid recycle conduit 48 which exits the first housing 16, and is connected to a heat exchanger 50 which is located downstream of the flue gas outlet 32 of the second housing 28. The hot-fluid recycle conduit 48 continues onward to another heat exchanger 52 which is connected to the pollutant-laden liquid line 36. An injection port 54, suitable for addition of an alkaline material, is connected to the pollutant-laden liquid line 36, upstream of the heat exchanger 52. The recycle conduit 48 continues on from the heat exchanger 52, to another heat exchanger 62, to a pump 64, and back to the first housing 16, where it is connected to the sensible-cooling heat exchanger/collection plate assembly 15 within the first housing 16.

As mentioned briefly above, the outlet 20 of the first housing 16 is connected to the inlet 30 of the second housing 28. Advantageously, this connection includes any type of conduit, duct, or other flue-gas passageway, referred to herein as a middle section 41, with the middle section 41 being of a volume suitable to enable chemical reactions to take place between the dust-reduced flue gas and the alkaline material which is placed into the middle section. Although the middle section 41 is not required, it enhances the efficiency of the treatment device 10 by enabling most of the chemical reactions between the dust-reduced flue gas and alkaline material to take place prior to the contacting of the dust-reduced flue gas and/or reaction product with the collecting-liquid delivery element 22 and the second electrostatic precipitator 24. The alkaline material tends to react quickly with sulfur dioxide, sulfur trioxide, and various forms of nitric oxides. Beneficially, the dust-reduced flue gas is exposed to the middle section 41 of the device 10 for a period of from about 0.2 seconds to about 5 seconds.

Figure 6:
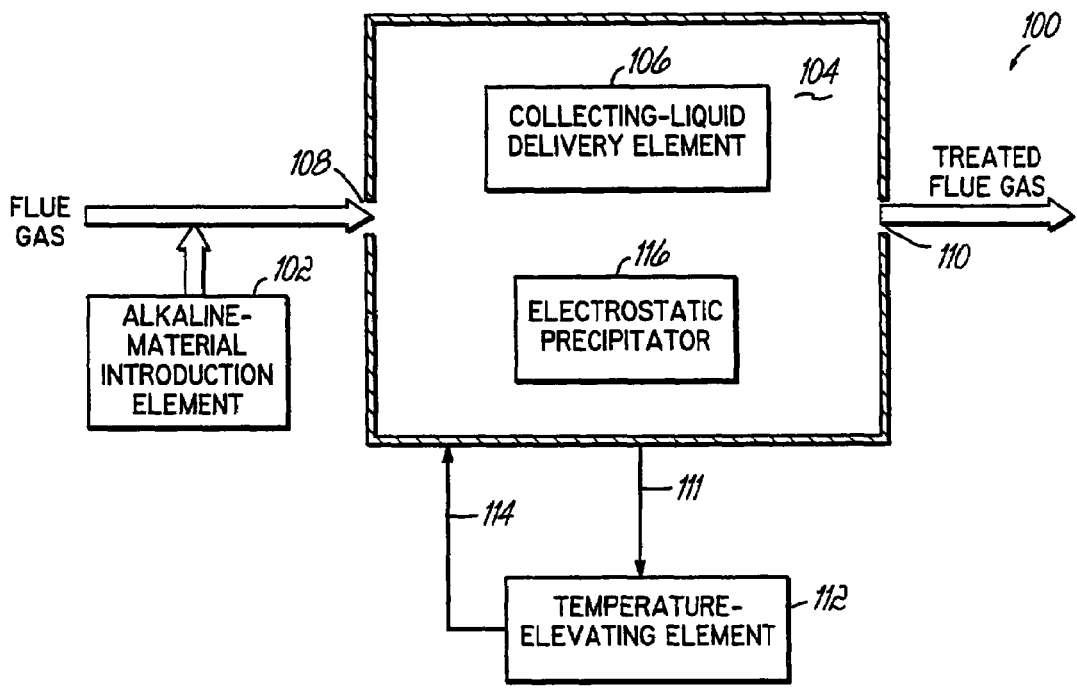
FIG. 6 is a schematic flow diagram of another version of the flue gas treatment system according to the principles of the invention.

Another flue gas treating device 100, according to the principles of the invention, is shown in FIG. 6. This particular device 100 includes an alkaline-material introduction element 102 capable of introducing an alkaline-material to a flue gas for reaction with at least a portion of the flue gas, thereby forming a reaction product. The device 100 also includes a housing 104 having a collecting-liquid delivery element 106 which is capable of contacting a collecting liquid with at least a portion of the reaction product, thereby forming a pollutant-laden liquid and a treated flue gas. The housing 104, itself, further includes a flue gas inlet 108 and a flue gas outlet 110. The flue gas treating device 100 further includes a pollutant-laden liquid line 111 connecting the housing 104 to a temperature-elevating element 112, and an ammonia/ammonia-derivative return line 114 connecting the element 112 to the housing 104. The temperature-elevating element 112 is capable of elevating the temperature of the pollutant-laden liquid, thereby liberating ammonia or an ammonia-derivative from the pollutant-laden liquid. The return line 114 enables delivery of liberated ammonia or an ammonia-derivative to the housing 104, where it may be combined with additional flue gas for the formation of additional reaction product. Advantageously, the device 100 also has an electrostatic precipitator 116, with the precipitator 116 including a collection surface (not shown), and the collecting-liquid delivery element 106 being capable of delivering a collecting liquid to the collection surface.

A further aspect of the invention is directed to a method of treating a flue gas containing a dust or a pollutant. This particular method includes the steps of sensibly cooling the flue gas, and removing at least a portion of the dust from the flue gas by electrostatic precipitation, thereby forming a dust-reduced flue gas. If desired, the method may include one or more additional steps as well. For example, the method may include reacting at least a portion of the dust-reduced flue gas with an alkaline material, thereby forming a reaction product. If desired, this step may be followed by contacting at least a portion of the dust-reduced flue gas and reaction product with a collecting liquid, thereby forming a pollutant-laden liquid and a treated flue gas. Alternatively, the reacting step may be omitted, and at least a portion of the dust-reduced flue gas may be contacted with a collecting liquid, thereby forming a dust-containing liquid. The treatment method discussed above also may include exposing the dust-reduced flue gas and reaction product to an electrostatic precipitator.

As used herein, the term "alkaline material" refers to any material that, when dissolved either partially or entirely in water, has a pH greater than 7. Examples of a few of the alkaline materials which may be used to advantage in the present invention include ammonia, ammonia-derivatives, various sodium compounds, and various calcium compounds. In more detail, one example of a suitable ammonia derivative is urea. Compounds such as sodium hydroxide, sodium carbonate, sodium bicarbonate, calcium hydroxide, and calcium oxide provide further examples of suitable alkaline materials. In the step of reacting at least a portion of the dust-reduced flue gas with an alkaline material, ammonia is a particularly advantageous alkaline material.

If desired, the treatment method also may include the step of contacting at least a portion of the flue gas with an alkaline material, either prior to, or during, the step of sensibly-cooling the flue gas. And while any of a number of different alkaline materials may be used, calcium hydroxide, in a dry state, is particularly beneficial.

Advantageously the treatment method also includes the step of exposing at least a portion of the pollutant-laden liquid to an elevated temperature, thereby liberating ammonia or an ammonia-derivative from the liquid. For example, an alkaline material, such as calcium hydroxide, may be combined with a flue gas, coming from a furnace or other reactor. The flue gas then may be sensibly cooled, and a portion of the flue-gas dust may be removed by electrostatic precipitation thereby forming a dust-reduced flue gas. An alkaline material, such as, for example, ammonia, may be reacted with at least a portion of the dust-reduced flue gas thereby forming a reaction product. At least a portion of the dust-reduced flue gas and reaction product may be contacted with a collecting liquid, thereby forming a pollutant-laden liquid and a treated flue gas. The treated flue gas then may pass through a heat exchanger, thereby increasing the temperature of the flue gas entering the stack, with the increased temperature enabling the treated flue gas to climb higher into the atmosphere.

The method of treating a flue gas also may include elevating the pH of the pollutant-laden liquid by adding an alkaline material, and/or increasing the temperature of the pollutant-laden liquid. The addition of an alkaline material and/or heat to the pollutant-laden liquid provides many benefits. For instance, either or both of the steps may be used to remove sulfur from the pollutant-laden liquid in the form of a sulfur-containing salt, to remove a metal or metallic compound from the liquid, and/or to liberate ammonia or an ammonia derivative from the pollutant-laden liquid. For example, calcium hydroxide may be combined with the pollutant-laden liquid. In addition, heat generated during the step of sensibly cooling the flue gas may be directed to the pollutant-laden liquid, thereby providing at least a portion of the elevated temperature used to liberate ammonia or an ammonia-derivative from the pollutant-laden liquid. One of the many beneficial aspects of the method is that this liberated ammonia or ammonia-derivative may be reused by reacting it with additional flue gas. For example, if desired, recycled ammonia may be reacted with additional dust-reduced flue gas, thereby forming an additional reaction product.

Using the method of treating a flue gas, sulfur may be removed from the pollutant-laden liquid in any of a number of different ways. For example, if an alkaline material, such as calcium hydroxide, for example, is added, a sulfur-containing salt or salts will be formed, which may be readily separated from the pollutant-laden liquid. Alternatively, a sulfur-containing salt may be formed by boiling off the water in the pollutant-laden liquid. Yet another option of the method is to recirculate and recontact the pollutant-laden liquid with the collecting liquid, until the pollutant-laden liquid is saturated with at least one ammonium-containing compound, at which point, at least one insoluble sulfur-containing compound will be formed, which may be readily removed from the pollutant-laden liquid. In addition, various metals and/or metallic compounds may be separated from the pollutant-laden liquid upon addition of an alkaline material to the liquid.

An additional benefit of the treatment method is that chlorides and nitrogen-containing oxides may be removed from the pollutant-laden liquid in a step separate from the removal of metals, metallic compounds and sulfur-containing oxides. In particular, this aspect of the treatment method involves actually reducing the temperature of the pollutant-laden liquid, thereby forming a nitrogen-containing salt and/or a chlorine containing salt, either of which may be readily separated from the pollutant-laden liquid. Formation of a nitrogen-containing salt and/or a chlorine-containing salt also may be achieved by combining the temperature drop with an increase in pH, achieved, for example, by adding an alkaline material, or, in the alternative, solely by increasing the pH, without the temperature reduction step.

In yet a further aspect of the invention, a flue gas may be treated by: reacting at least a portion of the flue gas with an alkaline material, thereby forming a reaction product; contacting at least a portion of the reaction product with a collecting liquid, thereby forming a pollutant-laden liquid and a residual flue gas; exposing at least a portion of the pollutant-laden liquid to an elevated temperature, thereby liberating ammonia or an ammonia-derivative from the liquid; and reusing at least a portion of the liberated ammonia or ammonia-derivative by reacting the portion with additional flue gas, thereby forming additional reaction product. Advantageously, this particular aspect of the invention further includes exposing the reaction product to an electrostatic precipitator.

In a typical multiple-field flue-gas treatment system in accordance with the principles of the invention, such as the system shown in FIG. 1, the exhaust gas may be produced by a furnace or boiler at a rate of about 400,000 standard cubic meters ($sm^3$) per hour. The exhaust gas generally will have a temperature of from about 275° F. to about 325° F. and a dew point temperature of from about 105° F. to about 120° F. In such a system, the treatment usually takes from about 1 s to about 25 s in the first section, and from about 1 s to about 25 s in the second section. The collecting surface area of the collection plates of the second section typically amounts to from about 10% to about 60% of the total collecting surface area of the system. The throughput of the liquid with which the collection plates are wetted generally amounts to from about 10,000 m³/h to about 100,000 m³/h. A field strength in the range of from about 5 to about 60 kV/cm may be used, and the measured residual content of dust-like materials usually amounts to from about $1\times10^2$ to about $1\times10^5$ mg/cm³ after the treatment in the first section, and to from about 1 to about $1\times10^4$ mg/cm³ after the treatment in the second section. The temperature drop adjacent the wetted collection plates amounts generally to from about 1 to about 100° F. Each of the first and second sections of such a multiple-field system contains at least one electrostatic field. If the exhaust gas rate amounts to about 400,000 m³/h, the field strength should be from about 5 to 60 kV/cm, and the total collecting surface area of the system should be in the range of from about 400 to about 700 m².

Although heat exchanger plates and collection plates have been described with regard to the device 10, the plate-like collecting surfaces may consist of metal plates, metal nets, plastic woven fabrics or plates of ceramic materials. Also, the liquid which is fed to the second section 13 at the top ends of the collection plates 33 may consist of an aqueous solution, and the dust collecting apparatus may consist of any of a number of conventional devices, such as conveyor screws, hoppers or augers, for example.

An advantage afforded by the flue-gas treatment device 10 is that the pollutants are captured in the second section 13, with the substantially dry dust having been collected in the first section 11. Accordingly, the various recovered materials may be used in beneficial post-recovery applications, or disposed of with greater ease.

In accordance with another aspect of the invention, the residence time of the gases in the second section 13 amounts to from about 20 to about 80% of the entire residence time in the device 10. In accordance with a further aspect of the invention, the liquid which is employed in the second section 13 consists of an alkaline aqueous solution having a pH value of from about 7 to about 13. If such an alkaline aqueous solution is employed, the acid pollutants will be bound to a relatively high degree so that the treated gas discharged from the second section 13 is almost free of acid pollutants. In accordance with yet another aspect of the invention, NaOH, KOH, and/or $Ca(OH)_2$ is added to an aqueous collecting liquid in the second section 13. These substances are easily soluble in water so that the pH of the aqueous collecting solution can be adjusted quickly and without difficulty to a value in the range of from about 7 to about 9.

In accordance with a further version (not shown) of the invention, a pipe is provided at the top end of each collecting plate of the second stage, and is directly joined to the collecting plate. The side of the pipe which faces away from the collecting plate has bores, which are disposed in the plane of the collecting plate; the pipe communicates with the source of liquid and collecting troughs are provided at the bottom ends of respective collecting electrodes of the second stage. The pipe may be joined to the collecting plate, e.g., by welding, by an adhesive joint, or by a screw or rivet joint. In the apparatus, in accordance with the invention, the thickness of the film formed by the liquid may be optimized by a change of the rate at which the liquid is supplied. It also may be desirable to vary the rate of flow of the liquid in a predetermined cycle during a continuous supply of liquid. If desired, the bores may have a diameter of from about 1 mm to about 100 mm, resulting in a particularly uniform distribution of the liquid on a given collecting plate. In addition, the bores may be spaced from about 1 mm to about 10 mm apart. With that spacing, the thickness of the layer of liquid on the collection plates may be adjusted in a highly effective way because a liquid film having a constant thickness will already have been formed on the outside surface of the pipe.

EXAMPLE

The following example assists in illustrating the method and apparatus of the present invention, but is not to be taken as limiting the present invention in any regard.

Exhaust gas is produced by a flue gas generator at a rate of about 400,000 standard cubic meters (sm³) per hour. The exhaust gas has a temperature of about 275° F. and a dust content of $5\times10^6$ g/sm³. The treatment in the multiple-field precipitator flue-gas treatment system takes about 12 s in the first section and about 10 s in the second section. The collecting surface area of the collecting plates of the second section amounts to about 40% of the total collecting surface area of the treatment system. The throughput of the liquid with which the collecting plates are wetted amounts to about 67,000 m³/h. A field strength in the range of from about 17 to about 20 kV/cm is used, and the measured residual content of dust-like materials amounts to about $1\times10^2$ mg/cm³ after the treatment in the second stage. The limits for vaporous and gaseous inorganic substances, particularly the limit of 100 mg/cm³ for $SO_2$, are not exceeded in the experiment. The temperature drop adjacent the wetted collecting plates amounts to about 20° F. As a result, the gas temperature is decreased to about 183° F. and the dew-point temperature is raised to about 47° F.

Having described the drawings in detail, what is claimed is:

1. A method of treating a flue gas containing a dust and a pollutant, comprising the steps of:
   reacting at least a portion of the flue gas with ammonia or an ammonia derivative, thereby forming a reaction product;
   contacting at least a portion of the reaction product with a collecting liquid, thereby forming a pollutant-laden liquid and a treated flue gas;
   exposing at least a portion of the pollutant-laden liquid to an elevated temperature, thereby liberating ammonia or an ammonia derivative from the liquid; and
   reusing at least a portion of the liberated ammonia or ammonia derivative by reacting the portion with additional flue gas, thereby forming additional reaction product.

2. The method of claim 1 wherein the contacting step includes exposing the reaction product to an electrostatic precipitator.

3. The method of claim 1 further including the step of exposing the reaction product to an electrostatic precipitator.

* * * * *